United States Patent

Ho et al.

[11] Patent Number: 5,883,310
[45] Date of Patent: *Mar. 16, 1999

[54] MICROMACHINED HOT-WIRE SHEAR STRESS SENSOR

[75] Inventors: Chih-Ming Ho, Rancho Palos Verdes; Yu-Chong Tai, Pasadena; Fukang Jiang, Alhambra; Chang Liu, Pasadena; Jin-Biao Huang, Los Angeles, all of Calif.

[73] Assignee: The Regents of the University of California, Oakland, Calif.

[*] Notice: This patent issued on a continued prosecution application filed under 37 CFR 1.53(d), and is subject to the twenty year patent term provisions of 35 U.S.C. 154(a)(2).

[21] Appl. No.: 428,334

[22] Filed: Apr. 25, 1995

Related U.S. Application Data

[63] Continuation-in-part of Ser. No. 334,422, Nov. 4, 1994.
[51] Int. Cl.⁶ .................................................. G01B 7/16
[52] U.S. Cl. .............................. 73/766; 73/777; 73/720
[56] References Cited

U.S. PATENT DOCUMENTS

| | | | |
|---|---|---|---|
| 4,322,980 | 4/1982 | Suzuki et al. | 73/727 |
| 4,342,231 | 8/1982 | Yamamoto et al. | 73/727 |
| 4,519,401 | 5/1985 | Ko et al. | 73/721 |
| 5,209,122 | 5/1993 | Matly et al. | 73/727 |
| 5,242,863 | 9/1993 | Xiang-Zheng et al. | 437/228 |
| 5,291,781 | 3/1994 | Nagata et al. | 73/204.26 |
| 5,303,593 | 4/1994 | Kremidas | 73/727 |

FOREIGN PATENT DOCUMENTS 2-0134424  5/1990  Japan ................................ 73/204.26

*Primary Examiner*—Max H. Noori
*Attorney, Agent, or Firm*—Daniel L. Dawes

[57] ABSTRACT

A micromachined hot-wire anemometer having fast response times and higher sensitivities than conventional hot-wire anemometers is provided by micromachining doped polysilicon wires carried on silicon supports cantilevered from a substrate including one or more insulating layers disposed between said substrate and supports. The micromachined polysilicon hot-wire anemometer is fabricated using surface micromachining techniques.

A shear stress sensor is micromachined to define a thin diaphragm over a cavity defined in a substrate underlying the diaphragm. The cavity is evacuated, sealed, and a thermistor disposed over the diaphragm. The thermistor is thus thermally insulated from the substrate and provides a low profile shear stress sensor for measuring flow rates in boundary layers above a flow surface.

3 Claims, 8 Drawing Sheets

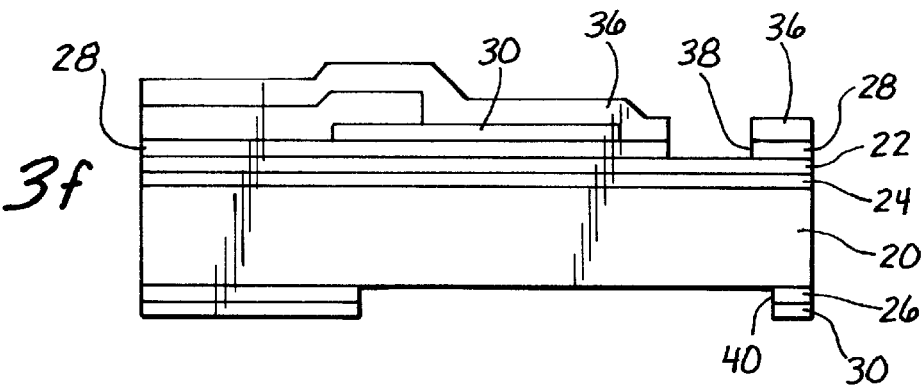
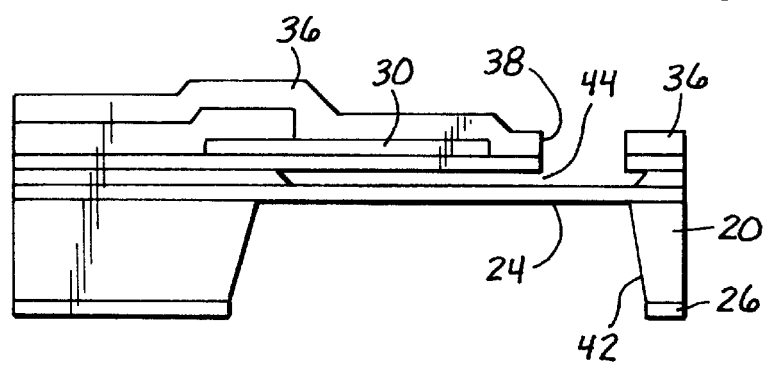
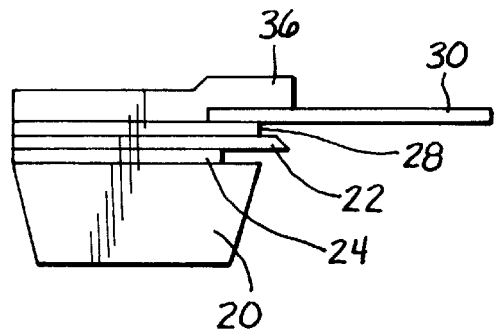
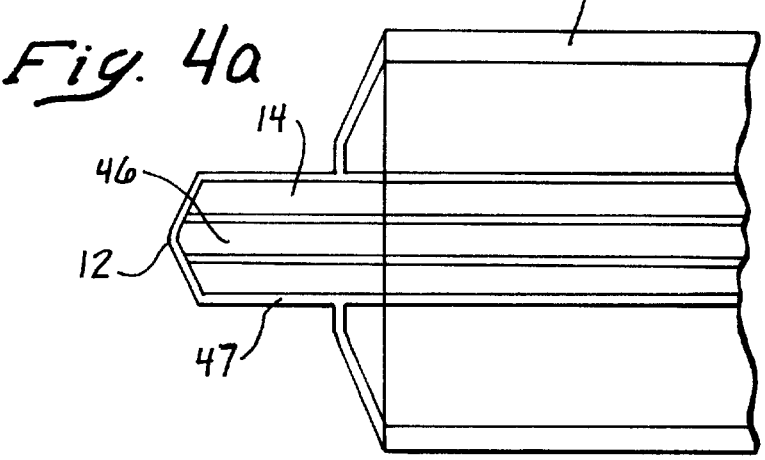

MICROMACHINED HOT-WIRE SHEAR STRESS SENSOR

RELATED APPLICATIONS

This application is a continuation-in-part of U.S. patent application Ser. No. 08/334,422, filed Nov. 4, 1994.

The United States Government has certain rights in this invention pursuant to Grant No. F 49620-92-J-0424 and F 4962-1-93-0332 awarded by the United States Air Force.

BACKGROUND OF THE INVENTION

1. Field of the Invention

The invention relates to the field of microelectromechanical systems (MEMS), and in particular to micromachined anemometers.

2. Description of the Prior Art

A hot-wire anemometer is a thermal transducer which is capable of sensing point flow velocity by means of temperature variations using a heated resistive wire which is a nonzero temperature coefficient of resistance. When the electrically heated wire is placed in flow of fluid, heat is taken away by flow-induced forced convection. Depending upon the operational mode used, e.g. constant current or constant temperature, either the resistance or the voltage output drop across the wire is then a function of the flow velocity.

Conventional hot-wire anemometers have been used for flow velocity measurements for more than 80 years. The conventional structure is a metal wire, welded or soldered between two metal needles, which are molded to a probe body. The wire is usually made of platinum or tungsten and is typically 5 microns in diameter and 1 millimeter in length. The wire typically has a resistance of 10 to 30 ohms at room temperature and requires 10 to 40 milliamps of current to operate. Conventional anemometers are usually hand-assembled, thus making it difficult and expensive to incorporate them into large arrays for simultaneous velocity distribution measurements. Also, since the wire diameter is difficult to control with good repeatability, the anemometer probes are essentially noninterchangeable without recalibrating the anemometer system.

Since the spatial resolution of the anemometer for flow velocity distribution measurements is determined by the anemometer's dimensions, it is advantageous if the wire size could be reduced. This would reduce power consumption and thermal interference to the flow and increase frequency response. In fact, many prior art anemometer designs have been demonstrated using either surface or bulk micromachining technologies. See, Y. C. Tai et al., "*Polysilicon Bridge for Anemometer Application*," Digest Tech Papers, Transducers '85, Philadelphia, Pa., Jun. 4–7, 1985 at 354–57; H. Rahnamai et al., "*Pyroelectric Anemometers: Preparation of Velocity Measurements*," Sensors and Actuators, Volume 2, at 3–16 (1981); M. Stenberg et al., "*A Silicon Sensor for Measurement of Liquid Flow and Thickness of Fouling Biofilms*," Sensors and Actuators, Volume 13 at 203–21 (1988); B. W. Van Oudheusden et al., "*Integrated Silicon Flow Direction Sensor,*" Sensors and Actuators, Volume 16, at 109–19 (1989); and R. Kersjes et al., "*An Integrated Sensor for Invasive Blood-Velocity Measurement*," Sensors and Actuators, Volume 37–38 at 674–78 (1993).

Interestingly, however, these anemometers are either bulk micromachined chip-size devices or wires on top of chips. No one has been able to simulate the features of a conventional hot-wire, that is a wire free-standing in space without anything nearby so that good thermal isolation is achieved. As a result, the prior art anemometers are not direct replacements for conventional hot-wire anemometers.

Therefore, what is needed is a new type of micromachined anemometer that is capable of performance simulation of conventional hot-wire anemometers, but with a greatly reduced wire size, improved spatial resolution, improved device sensitivity, and improved frequency response.

In order to modify a surface to reduce drag or to control vortices within the boundary layer above the surface, sensors must be able to provide flow field information having a spatial resolution of the order of 100 microns and a frequency response of greater than a kHz. Shear stress sensors previously used exploit either a direct or indirect method for shear stress detection. In the direct method, a tangential force on a surface floating balance gives a direct measurement to the shear stress. In the indirect method, shear stress is extracted from other physical measurands that are indirectly related to shear stress such as Preston tubes, Stanton tubes and hot-wire/film surface mounted sensors. These conventional shear stress sensors, however, can only be hand-made, one at a time, and therefore ill-adapted for use in a system where thousands of uniform sensors are required.

In response, the prior art has developed micromachined surface floating balance for direct shear stress measurements. Sensitivity is 52 microvolts/Pa for gas sensing and 13.7 microvolts per volt-kPa for liquid sensing have been reported using a piezo resistive readout. Flow sensors based on heat transfer principles have also been demonstrated in micromachined sensors using free-standing beams, free-standing diaphragms and low thermal conductivity layers such as polyimid. Unfortunately, none of these devices are adaptable for use in large array vortices control within a boundary layer.

Therefore, what is needed some type of shear stress sensor adaptable for use in large arrays for vortice control within a boundary layer.

BRIEF SUMMARY OF THE INVENTION

The invention is a micromachined polysilicon hot-wire anemometer comprising a micromachined sensing wire and two parallel micromachined supports for supporting the sensing wire. The sensing wire extends between the two supports. A micromachined support base underlies the sensing wire supports for providing rigidity to the sensing supports. The sensing wire is disposed by the sensing wire supports away from the base to thermally isolate the sensing wire from the base and to extend the sensing wire into the fluid flow. As a result, low cost fast anemometer is provided.

The anemometer further comprises a beam disposed between the sensing wire supports and the base for providing a thermomechanical buffer therebetween. In one embodiment the sensing wire and sensing wire supports are uniformly doped, highly dosed boron polysilicon. The sensing wire is doped by high dose boron implantation and is uniformly dosed.

In another embodiment the sensing wire is nonuniformly dosed having a first portion defined along its length which is low dose implanted and a second portion defined along its length which is high dose implanted.

The low dose portion of the sensing wire is disposed along the length of the sensing wire in the center of its width and the high dose portion is disposed on at least one side thereof along the length of the sensing wire.

In addition to using silicon for the sensing wire, the sensing wire may be comprised of tungsten, or platinum. The sensing wire may be devised to have either a positive or negative temperature coefficient of resistance. A passivating layer may be disposed on at least the sensing wire and also on the supports. In one embodiment the supports are comprised of single crystal silicon. The supports are may be comprised of thin or thick film material.

The base of the anemometer is fabricated from surface machined semiconductor material and may further comprise an integrated circuit formed therein.

In one configuration of the anemometer a plurality of sensing wires are disposed between the two supports. In another configuration a plurality of supports are provided with a corresponding plurality of sensing wires disposed between adjacent ones of the supports.

The invention is also a method of fabricating a micromachined anemometer comprising the steps of providing a substrate having a top and bottom planar surface. An etch stop layer is defined at a predetermined distance below the top surface. An insulating layer is formed on the top surface of the substrate. A surface micromachinable layer is selectively disposing on the insulating layer. Selected portions of the substrate above and below the etch stop layer are removed to define at least part of the surface micromachinable layer as a cantilevered support extending from the substrate. A sensing wire is selectively defined in the surface micromachinable layer. The etch stop layer is removed to provide an exposed sensing wire thermally insulated from the substrate.

The substrate provides a substrate with an epitaxial crystalline semiconductor layer disposed on the etch stop layer. The method further comprising the step of disposing metalization on the surface micromachinable layer to provide electrical contact to the sensing wire. A geometry of the sensing wire is lithographically selectively defined.

The invention also includes a micromachined thermal shear stress sensor comprising a substrate having a vacuum cavity defined therein. A diaphragm is disposed on the substrate across the vacuum cavity. A thermistor is disposed on the diaphragm so that the thermistor is thermally isolated from the substrate by the vacuum cavity. The thermistor is made of silicon or platinum. It may further include a passivating layer disposed on the thermistor to prevent drift. Metalizations are provided for conductive electrical external circuit connection.

The invention is also a method for fabricating a micromachined shear stress sensor having a low profile for boundary layer flow detection comprising the steps of providing a substrate. A window is selectively defined on the substrate wherein a portion of the substrate is exposed through the window. A sacrificial layer is provided within the window. A diaphragm is disposed over the sacrificial layer and over the window. At least one etch hole is defined through the diaphragm to expose the sacrificial layer. The sacrificial layer is selectively removed to define a cavity in place of the window defined in the substrate. The cavity is sealed under at least a partial vacuum to provide thermal insulation between the diaphragm and the substrate. A thermistor is disposed on the diaphragm so that thermistor is thermally isolated from the substrate.

The step of selectively disposing the sacrificial layer comprises forming an oxide layer within the window and selectively disposing a sacrificial phosphosilicate glass layer over the oxide layer. The step of sealing the cavity comprises disposing a silicon nitride layer over the diaphragm filling each etch hole defined therethrough.

The invention may be better visualized by now turning to the following drawings wherein like elements are referenced by like numerals.

BRIEF DESCRIPTION OF THE DRAWINGS

FIGS. 3a–3h are cross-sectional views of the anemometer of FIG. 1 illustrating the method of its manufacture in the case where a Type II wire is fabricated.

FIGS. 4a–4d a top plan views of the tips of additional embodiments of anemometers devised according to the invention.

The invention and its various embodiments may now be better understood by turning to the following detailed description.

DETAILED DESCRIPTION OF THE PREFERRED EMBODIMENTS

A micromachined hot-wire anemometer having fast response times and higher sensitivities than conventional hot-wire anemometers is provided by micromachining doped polysilicon wires carried on silicon supports cantilevered from a substrate including one or more insulating layers disposed between said substrate and supports. The micromachined polysilicon hot-wire anemometer is fabricated using surface micromachining techniques.

A shear stress sensor is micromachined to define a thin diaphragm over a cavity defined in a substrate underlying the diaphragm. The cavity is evacuated, sealed, and a thermistor disposed over the diaphragm. The thermistor is thus thermally insulated from the substrate and provides a low profile shear stress sensor for measuring flow rates in boundary layers above a flow surface.

Figure 1:
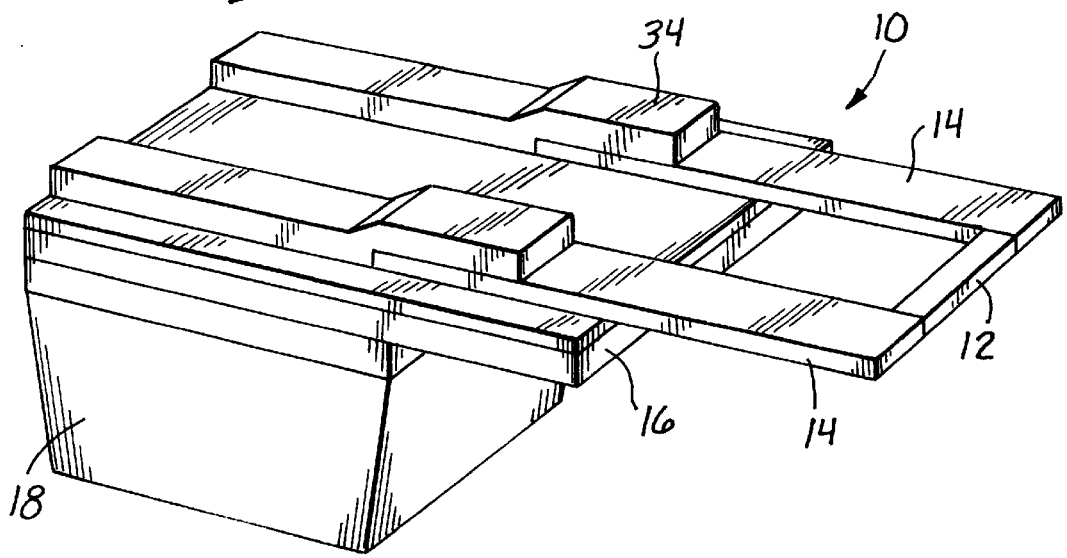
FIG. 1 is perspective view of a completed micromachined hot wire anemometer devised according to the invention.

FIG. 1 is a perspective view of a fabricated micromachined anemometer according to the invention. The anemometer, generally denoted by reference numeral 10, is comprised of a sensing wire 12 extending between parallel cantilevered doped polysilicon supports 14, supported by a silicon beam 16, which in turn is disposed on a thick silicon handle 18. Aluminization contact pads 34 are disposed on and electrically coupled with doped supports 14. Silicon beam 16 acts as a thermomechanical buffer between polysilicon support 14 and handle 18 to avoid interference with fluid flow.

Sensing wire 12 is approximately 0.5 micron thick, 1 micron wide and 10 to 160 microns long. The cross-sectional configuration of wire 12 may assume any geometry and in the illustrated embodiment it is trapezoidal. Sensing wire 12 is free-standing to optimize the interaction with the fluid flow and to minimize thermal conduction to handle 18. Polysilicon, instead of platinum or tungsten, is used as sensing supporting material in the embodiment of FIG. 1 because of its compatibility with existing micromachining technologies and further because of its controllable temperature coefficient resistance in the range of −1 percent per degree C. to +0.2 percent per degree C. depending upon the doping concentration. The doping concentration of $10^{18}/cm^3$ corresponds to a reproducible temperature coefficient of resistance of −1 percent per degree C. for polysilicon with which high thermal sensitivity can be achieved even at low operating temperatures.

A first embodiment of an anemometer utilized silicon nitrite to encapsulate the polysilicon probe wires. A second embodiment allows the wires to be exposed directly to air and consequently the frequency response is improved by an order of magnitude.

Polysilicon wires 12 can be uniformly doped by a high dose boron implantation (Type I) or nonuniformly doped by low dose implantation followed by a high dose implantation with the 2-micron center portion of polysilicon wire 12 being masked (Type II). Type I polywires behave similarly to platinum and tungsten wires. For Type II polysilicon wires, the resistance and ohmic heating are concentrated at the 2-micron lightly doped center region. The other part of the wire acts only as the electrical conductor and mechanical support. This type of wire provides improved frequency response and spatial resolution over Type I wires. However, the sensitivity of a device using a Type II wire is not necessarily higher than a device using a Type I wire even with a much larger temperature coefficient resistance, because the temperature change caused by the forced convection may not be as high as that of longer wires. Since the lightly doped part of a Type II wire 12 is very short, the total resistance of the anemometer is still within a reasonable range, typically less than 20 kiloohms, which is easily handled by signal processing circuits.

The structure of the anemometer shown in FIG. 1 can be better understood by now considering its fabrication. Polysilicon deposited in an amorphous state and then crystallized has more controllable qualities than as-deposited polysilicon with the deposition temperature of 620 degrees C. Crystallized amorphous polysilicon is utilized in the fabrication of the anemometer of the invention. Its temperature coefficient resistance is about 50 percent higher and its temperature behavior is more linear than normal polysilicon in the high doping ranges. The stress distribution in this type of polysilicon along the depth is also much more uniform. Calibration results show that $2 \times 10^{20}$ per $cm^3$ is the doping concentration which gives the lowest sheet resistivity, e.g. about 20 ohms per $cm^2$ and the highest positive temperature coefficient resistance.

Therefore, this doping concentration is the optimum for heavily doped leads in Type II anemometers and for the whole wire in a Type I anemometer. The doping in the center part, e.g. $10^{18}$ $cm^3$, for a Type II wire is determined such that the resistance ratio near the operating point between the center part and the leads is between approximately 10 and 20. This doping concentration also gives the satisfactory temperature coefficient resistance of approximately −1 percent per degrees centigrade.

Another factor which needs to be considered for a Type II device is how to avoid lateral diffusion of the boron dopants from the heavily doped leads into the center part of the wire during the annealing process which follows after boron ion implantation. The annealing temperature must not be so high that it causes significant lateral diffusion in the standard 30 minute annealing process, but it cannot be so low that stable polysilicon resistors cannot be made. Therefore, calibration of the lateral boron diffusivity and nonuniformly doped polysilicon is empirically measured versus temperature. The highest annealing temperature for Type II wire is determined according to the invention to be 900 degrees centigrade from the diffusion model based on the data developed in this invention.

The method of fabrication of a Type I uniformly doped wire is described specifically in connection with FIGS. 2a–2h. The fabrication starts as shown in the cross sectional view of FIG. 2a with the oxidation of a (100) silicon wafer 20 which has a 10 micron lightly doped epitaxial layer 22 on top of a heavily doped boron etch stop layer 24. The backside of silicon substrate 20 is provided with a thick oxide layer 26. A 0.5 micron thick oxide layer 28 is formed on top of epitaxial layer 22.

Figure 2A:
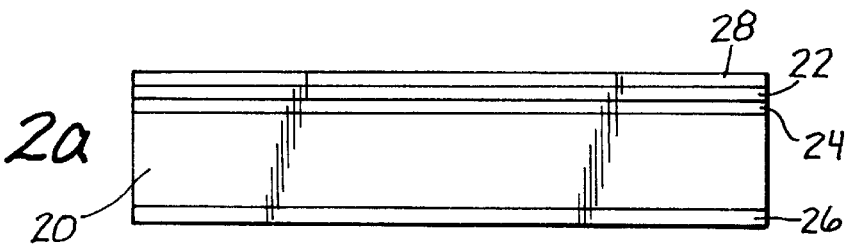
FIGS. 2a–2h are cross-sectional views of the anemometer of FIG. 1 illustrating the method of its manufacture in the case where a Type I wire is fabricated.
Figure 2B:
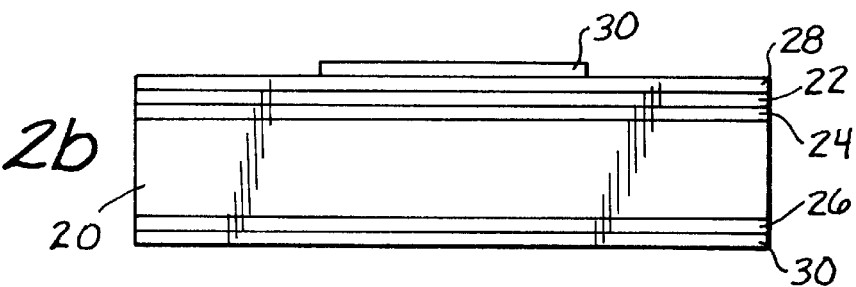
Figure 2C:
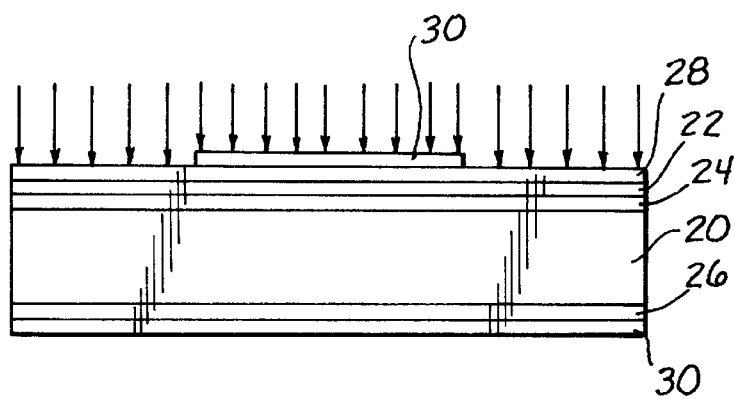
Figure 2D:
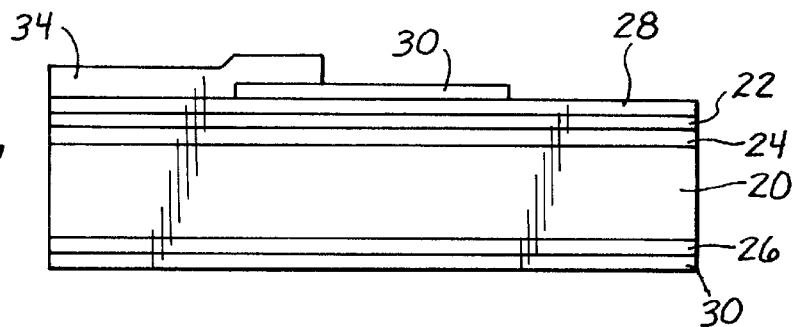

A 600 nanometer amorphous silicon layer 30 is deposited at 560 degrees C. and patterned by plasma etching as shown in FIG. 2b to form the structures which will become wire 12 and supports 14 described in FIG. 1. Boron ion implantation with a dose of $10^{16}$ per $cm^2$ at an energy of 80 keV is then performed to dope polysilicon layer 30 resulting in the structure seen in FIG. 2c. The doped polysilicon is then annealed at about 1,100 degrees centigrade for Type I wafers for approximately 30 minutes. Aluminum metalizations 34 then photolithographically patterned on the doped and annealed polysilicon 30 and silicon dioxide layer 28 as shown in FIG. 2d.

Figure 2E:
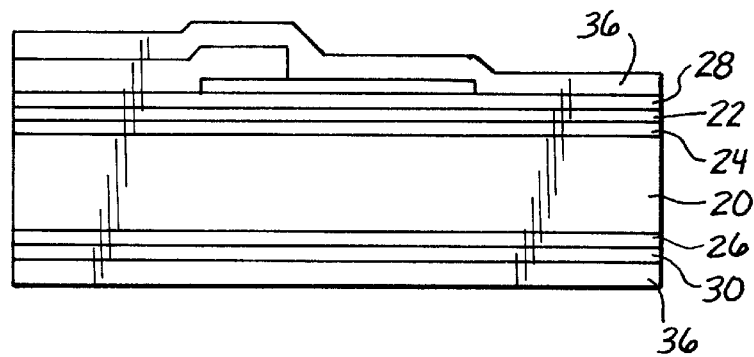
Figure 2F:
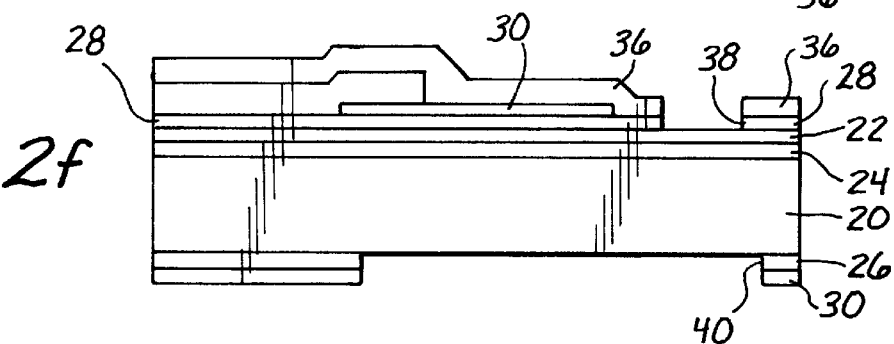
Figure 2G:
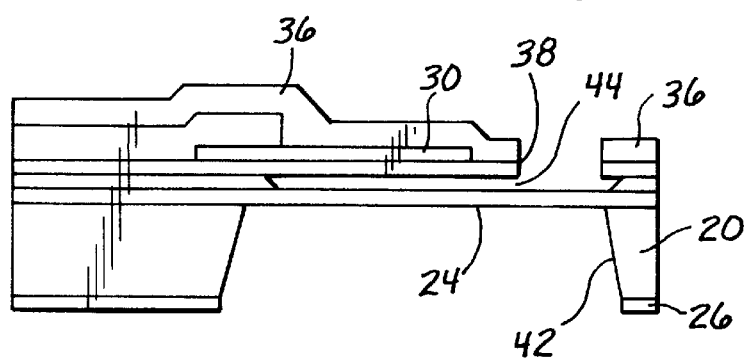
Figure 2H:
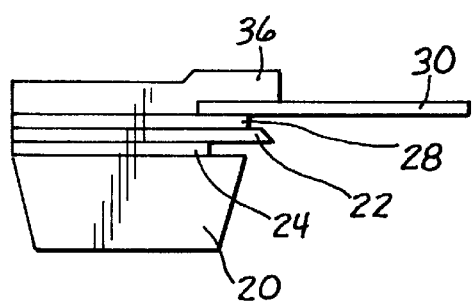

A 3-micron low temperature oxide layer 36 (LTO) is deposited at 450 degrees C. as shown in FIG. 2e and front side and back side windows 38 and 40, respectively, are defined and opened through LTO 36 and oxide layer 28 to expose epitaxial layer 22 in the top side and substrate 20 on the bottom side as depicted in FIG. 2f. Windows 38 and 40 are opened using both wet and dry etchants. A 10 hour EDP etching at 95 degrees C. removes silicon of substrate 20 to form a large cavity 42 underneath p-doped etch stop layer 24 and to undercut the anemometer probe, removing a portion of polysilicon layer 22 to form a cavity 44 as shown in FIG. 2g. Finally, Hydrofluoric Acid (HF)+Hitric Acid+Acetic Acid (HNA) (HNA) silicon isotopic etchant and pad oxide etchant are used to strip heavily doped boron layer 24 and LTO layer 36, respectively, to result in the structure shown in FIG. 2h with the manufactured structures described in connection with FIG. 1. The reference numerals have been changed between FIG. 1 and FIGS. 2a–2h to signify that the completed structures are denoted in FIG. 1, whereas the undifferentiated or intermediate structures from which the completed structures are formed are discussed in connection with FIGS. 2a–2h.

Figure 3A:
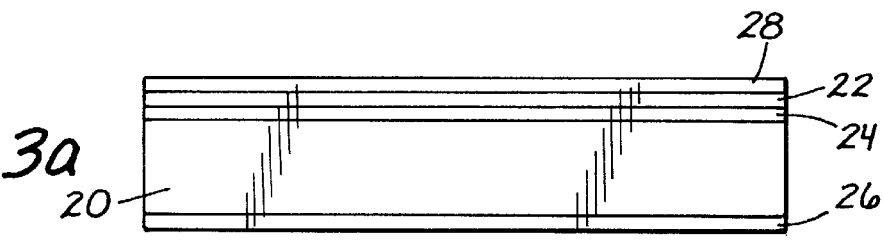
Figure 3B:
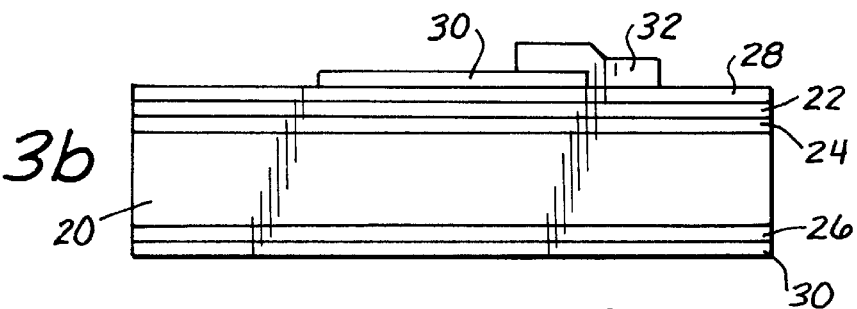
Figure 3C:
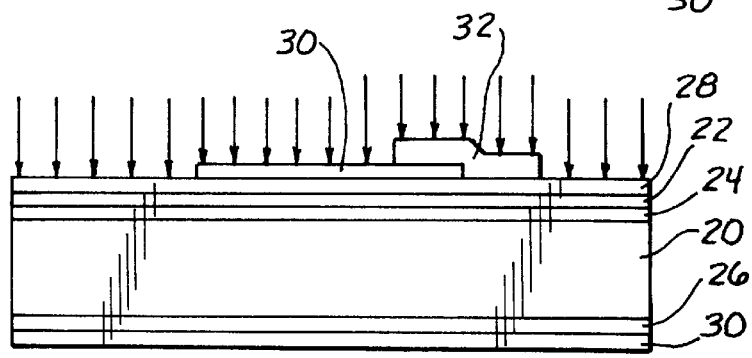
Figure 3D:
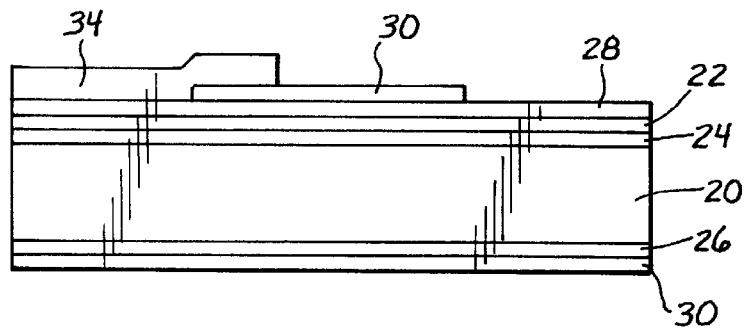
Figure 3E:
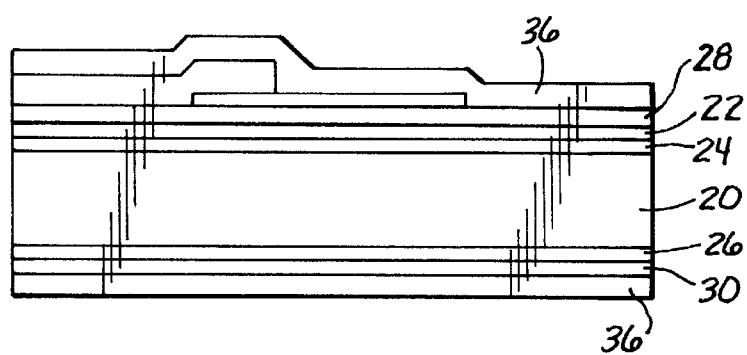

The method of fabrication of a Type II nonuniformly doped wire is described specifically in connection with FIGS. 3a–3h. The process steps are identical with respect to that described in connection with FIGS. 2a–2h, but at the step of FIG. 3b a thick photoresist layer 32 is selectively disposed on that portion of layer 30 which will become the lightly doped portion of wire 12. After boron implantation as shown at FIG. 3c, photoresist layer 32 is stripped low dose boron ions at about $10^{14}$ $cm^{-2}$ are implanted to dope the center part of the Type II wire 12. The doped layer is then annealed at 900 degrees C. for 30 minutes. The process then continues with the steps of FIGS. 3d–3h in the same manner as described in connection with FIGS. 2d–2h.

Figure 4B:
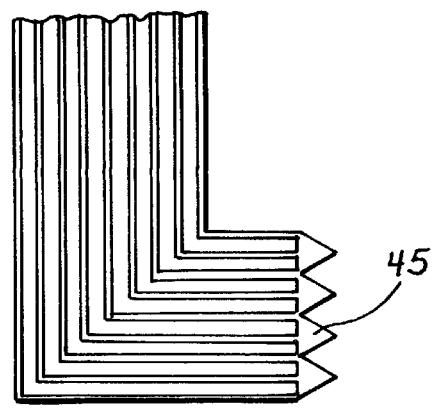

The physical form of the hot-wire anemometer may take any geometric configuration now known or later devised. FIGS. 4a–4d illustrate but three of a myriad of possible forms which could be used. FIG. 4a is top plan view of a first form in which a hot-wire 12 is suspended between two doped polysilicon conductive arms 14 connected to metalizations 34 with wire 12, arms 14 and space 46 defined therebetween covered with a passivating layer of silicon nitride 47.

FIG. 4b is a top plan view of the probe tip in reduced scale in which a plurality of probes of the type shown in FIG. 4a are fabricated in an array denoted generally by reference numeral 45.

Figure 4C:
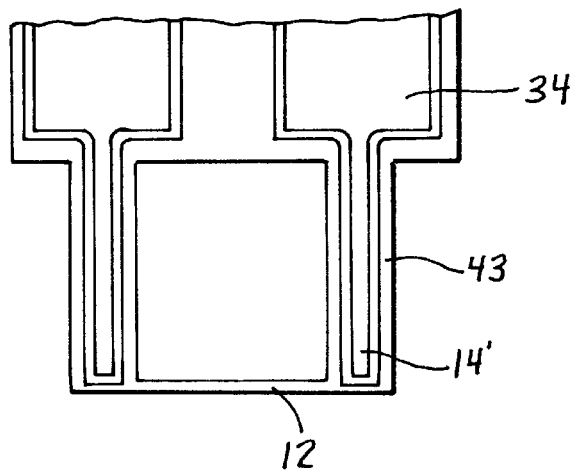

FIG. 4c is a top plan view of another embodiment in which arms 14 are provided with a heavily doped conductive center 14' disposed on polysilicon cantilevers 43 electrically coupled to a 70 micron thin wire 12 extended between conductive regions 14'.

Figure 4D:
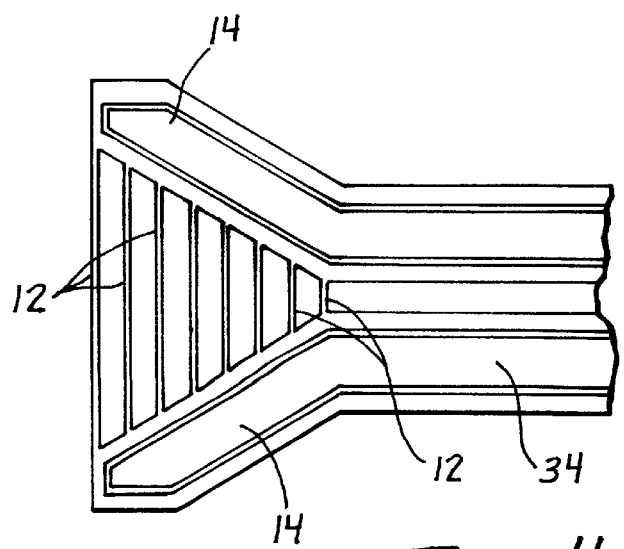

FIG. 4d is yet another embodiment in which arms 14 are formed in the shape of a V and a plurality of polysilicon wires 12 are disposed in parallel between the two opposing arms 14.

Consider now the time constants of devices made according to the invention. Anemometers can operate either in a constant current mode without feedback or in a constant temperature mode with feedback. For a wire of length L, width W thickness D, the solution of the differential thermal conduction convection equation for polysilicon in air at ambient temperatures, assuming that arms 14 are perfect heat sinks, provide a solution which is multimode. The first mode determines the time constant T given by the following equation:

$$T = T_1 T_2 (T_1 + T_2).$$

$T_1$ is a convection time constant which is a function of the current and parameters of the polysilicon wire geometry, while $T_2$ is a conduction time constant also a function of material parameters of the wire. $T_1$ will dominate in a long wire while $T_2$ dominates for short wires.

For Type II probes which are lightly doped in the center of the wire, $T=T_2$, and the effective length of wire 12 is longer than the actual length of the lightly doped portion of the wire. Type II anemometers have a much smaller time constant than Type I anemometers since their effective length is nevertheless less than the actual total length of the wire. The time constant is measured by passing a step current through the anemometer in still air and observing the voltage rise for a positive temperature coefficient of resistance or fall for a negative temperature coefficient or resistance. In steady flow with certain velocity applied, the time constant is reduced. For a conventional hot-wire of 5 microns in diameter, the time constant is usually about 0.5 milliseconds.

Figure 5:
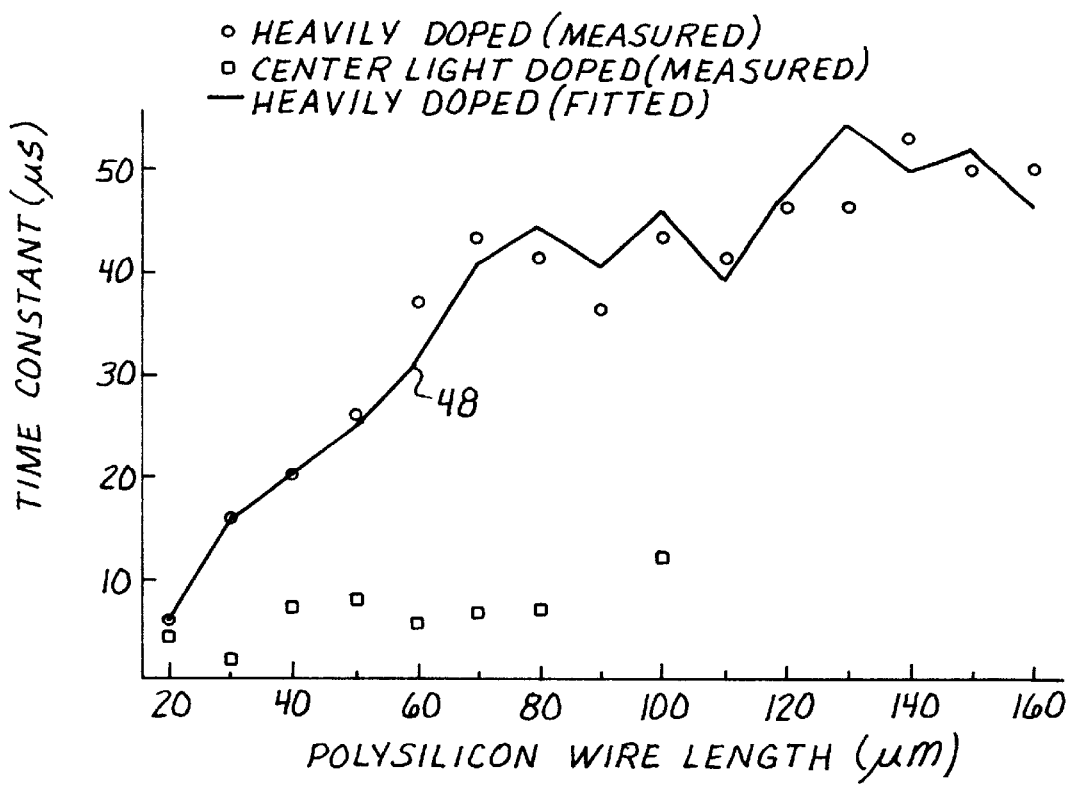
FIG. 5 is a graph of the thermal time constant as a function of wire length when the anemometer is operated in the constant current mode.

FIG. 5 illustrates the time constant as a function of polysilicon wire length for anemometers of the invention operated in a constant current mode. Solid line 48 is a fitted curve taken from the theoretical solution for Type I probes using a Nusselt number for the wire equal to 0.78, and a conductivity of 0.26 Watts per centimeter per degree centigrade. The fluctuation seen in FIG. 5 in the fitted curve are due to the scattering of the width of wire 12 arising from fabrication variations. The effective width, W, is calculated from the measured wire resistances with known sheet resistance of 30 ohms per $cm^2$.

In the case of Type II probes, the measured time constant does not change substantially as a function of length. A 30 micron Type II probe was observed to have a heating constant of 2 microseconds and a cooling constant of 8 microseconds when in the current constant mode.

Figure 6:
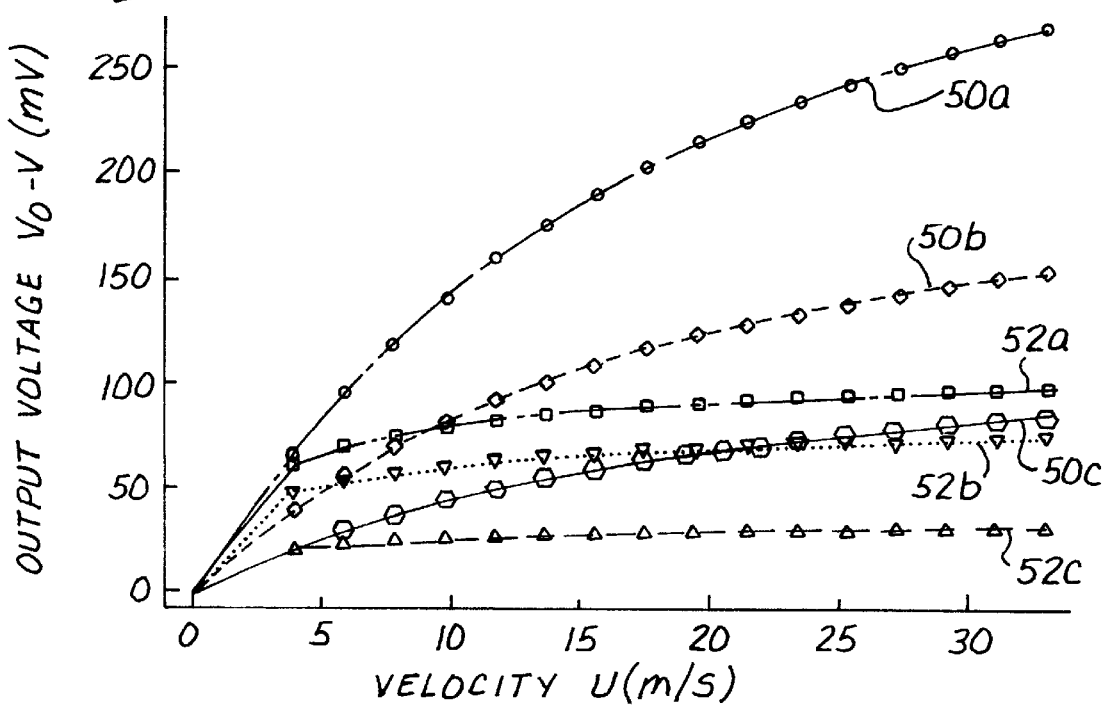
FIG. 6 is a graph of the output voltage as a function of air flow for a 70 micron long micromachined and conventional hot wire anemometer each operating at three different current settings in a constant current mode.

FIG. 6 is a graph of output voltage versus flow velocity of a 70 micron long heavily doped anemometer of the invention of the type as shown in FIG. 3c, as compared to a conventional hot-wire anemometer in a wind tunnel at different heat ratios without electronic gain. Curves 50a, b, and c represent the operation of the anemometer of the invention compared to curves 52a, b and c, which represent a conventional hot-wire probe. The sensitivity of the anemometer of the invention biased by 2 to 3 milliwatts is higher than that of the conventional anemometer operating at 4 to 8 milliwatts. This is due to the smaller size and the higher resistivity of polysilicon over platinum and tungsten. The voltage dropped across the anemometer, V, is a function of the flow velocity U is given by the equation:

$$V = A + BU^n$$

where A and B are constants. The power, n, of the velocity U in the anemometer in the invention is 1.1 compared to about 0.6 for a conventional anemometer. The anemometer in the invention therefore is more linear in response and has less degradation and sensitivity at high velocity ranges than the conventional anemometer. This is believed to be a result of heat conduction to the supports 14, which in turn causes a nonuniform temperature distribution, a situation which is usually avoided in conventional hot-wire anemometers with large flow velocities.

The directional dependence of the sensitivity has also been tested and is found to be nearly isotopic as long as the angle is not close to 90 degrees. This is surprising because theory would predict the direction of dependence of sensitivity should follow a cosine law, which is the case observed for conventional hot-wire anemometers. Although the reason for this behavior is currently unclear, one possible reason might be that supports 14 have interfered with the flow in the devices of the invention.

The directional sensitivity of a 20 micron long Type II anemometer was also tested and also found to be substantially isotropic, though not as much as a heavily doped Type I probe. The near isotopic characteristics of this probe can be explained by its short length. It was observed to have higher sensitivities than a Type I probe even at lower power.

The stress distribution along the depth of polysilicon which is deposited at 620 degrees centigrade and annealed at 1100 degrees centigrade is not uniform. Sometimes this would cause the tips of the anemometer probes in a wafer made of this type of polysilicon to bend upwardly by as much as 50 microns. Such bending is never observed in anemometers made of polysilicon deposited at 560 degrees C. and annealed at 1100 degrees C. The reason for this might be that the structure of as deposited and as implanted amorphous silicon films are uniform along their depth. During annealing, the grain growth is uniform so that the stress distribution is uniform as well.

It has also been observed that 70 micron long heavily doped probe will temporarily drift from a current of about 1.74 milliamps to about 1.71 milliamps over about 60 hours of operation. Several factors contribute to the drift. First, the polysilicon is not protected and can be oxidized during high temperature operation. This can be avoided by a conformal antioxidational coating over the free-standing polysilicon structures, which only increases the thermal time constant somewhat.

Second, since polysilicon has high diffusivity, the temperature nonuniformity in the electric field across the wire at the operating temperature of a few hundred degrees may cause the slow diffusion of dopants. However, the mechanism of dopant drift as a function of temperature is not clear and further improvements can be anticipated.

Consider now the fabrication of a shear stress sensor according to the invention. The shear stress sensor of the invention is a surface micromachined thermal shear stress sensor based upon a hot-wire design on a free-standing silicon nitride diaphragm. A diaphragm is mounted on a vacuum cavity which minimizes the heat conduction from the diaphragm to the substrate through the gap. This vacuum barrier significantly improves thermal isolation and provides an unprecedented shear stress sensitivity of about 15 volts per kPa under constant drive (2 milliamps, 12 milliwatts) for the microsensor.

Figure 7:
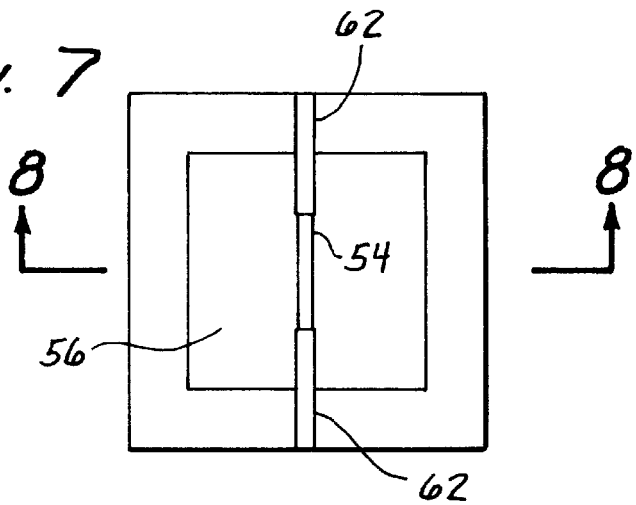
FIG. 7 is a plan top view of a shear stress sensor devised according to the invention.
Figure 8:
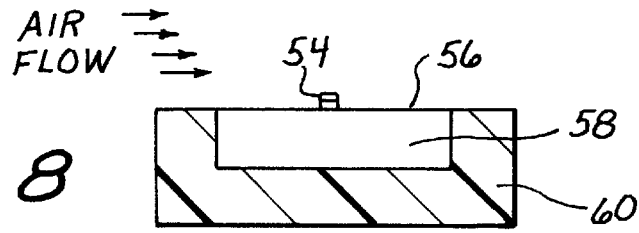
FIG. 8 is a cross-sectional view of the shear stress sensor as seen through the section lines 8—8 of FIG. 7.

FIG. 7 illustrates a top plan view of a shear stress sensor according to the invention. A polysilicon resistor 54, which in the illustrated embodiment is 80 to 200 microns long, 2 microns wide and 0.4 micro thick, is disposed across the center of a cavity diaphragm 56, which is about 200 by 200 microns square in size and about 2 microns above the bottom of a cavity 58 defined in a substrate 60 as best depicted in FIG. 8. Resistor 54 is attached at its ends with metalizations 62 for electrical connection to outside circuitry. Resistor 54 is uniformly doped to a low sheet resistance value of about 50 ohms per cm$^2$ with typical resistances between 2 and 5 kOhms.

Figure 9A:
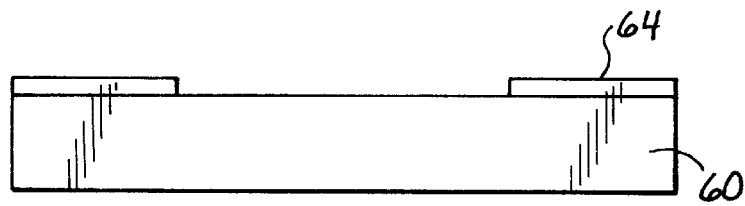
FIGS. 9a–9h are cross-sectional views of a substrate illustrating the manufacture of the shear stress sensor of FIGS. 7 and 8.
Figure 9B:
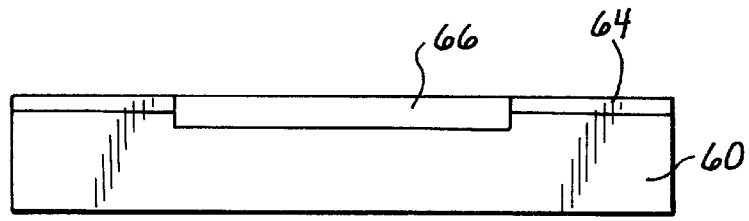
Figure 9C:
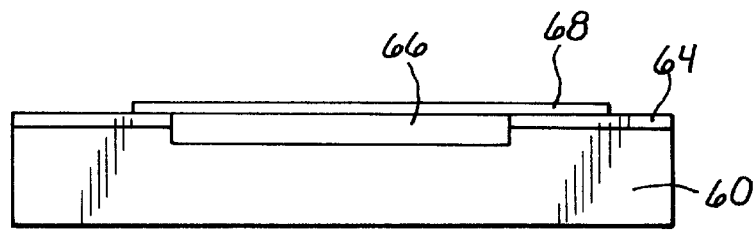
Figure 9D:
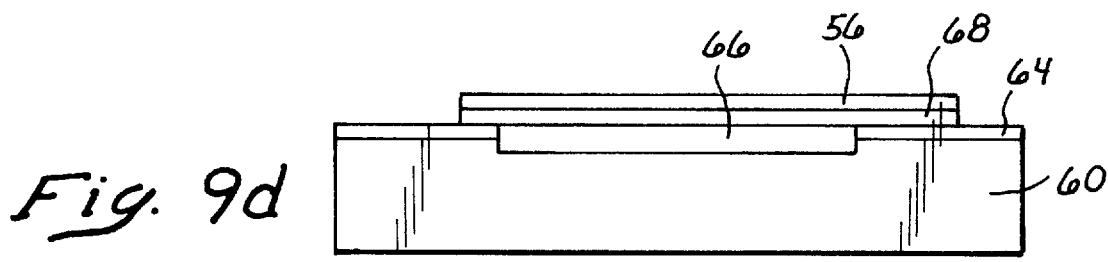
Figure 9E:
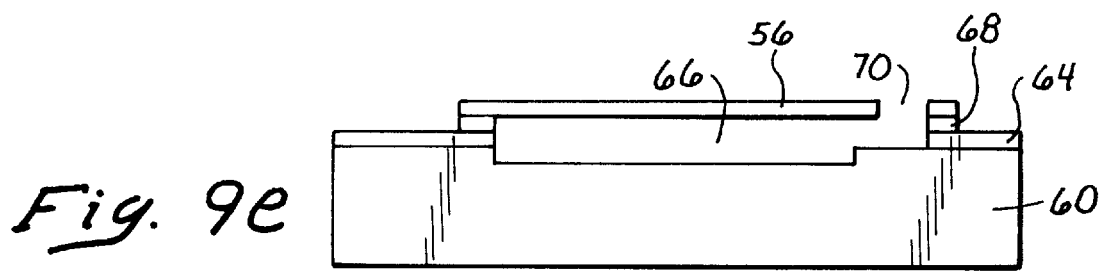
Figure 9F:
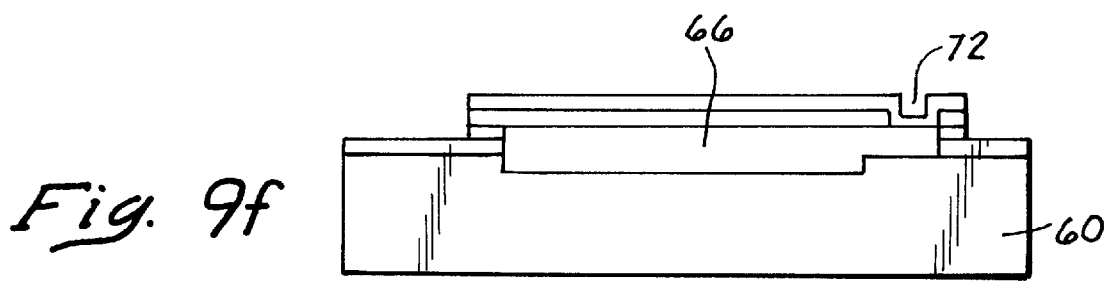

The device of FIGS. 7 and 8 is fabricated according to the methodology shown in FIGS. 9a–h. A silicon substrate 60 has a low pressure chemical vapor deposition silicon nitride layer 64 disposed thereon and patterned to define what will become cavity 58 as shown in FIG. 9a. A window having the outline of diaphragm 56 is etched down 600 nanometers into silicon substrate 60 by a wet silicon etchant and then planarized with a thermal oxide growth of 1.2 microns of the exposed silicon to form oxide layer 66 as shown in FIG. 9b. A 400 nanometer sacrificial phosphosilicate glass layer 68 is then disposed on silicon nitride layer 64 and 66 as shown in FIG. 9c. Layer 68 is patterned and followed by a selective deposition of 1 micron low stress silicon nitride layer as diaphragm 56 as shown in FIG. 9d. Etching holes 70 are then defined through nitride layer 56 to expose sacrificial phosphosilicate glass layer 68. Sacrificial layer 68 and the underlying thermal oxide 66, if any, is etched using a 49 percent hydrofluoric acid for about 20 minutes, to form cavity 58 as depicted in FIG. 9e. The fabricated wafer is then dried and a 400 nanometer silicon nitride layer 72 is then deposited at 300 milliTorr to seal cavity 58 under vacuum. The thickness of cavity diaphragm 56 is then at this point about 1.2 microns. The device has a form as shown in FIG. 9f.

Figure 9G:
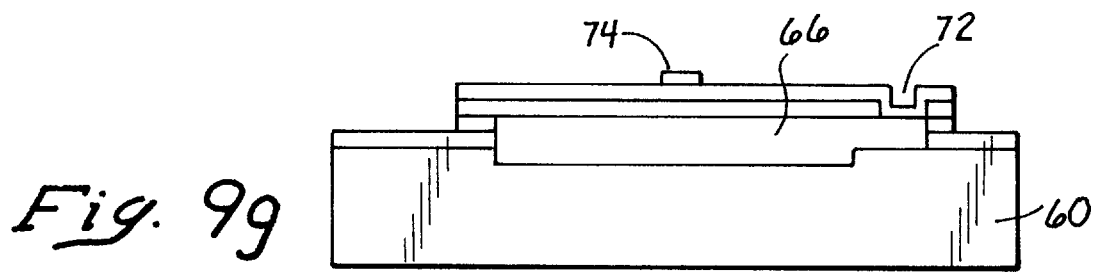
Figure 9H:
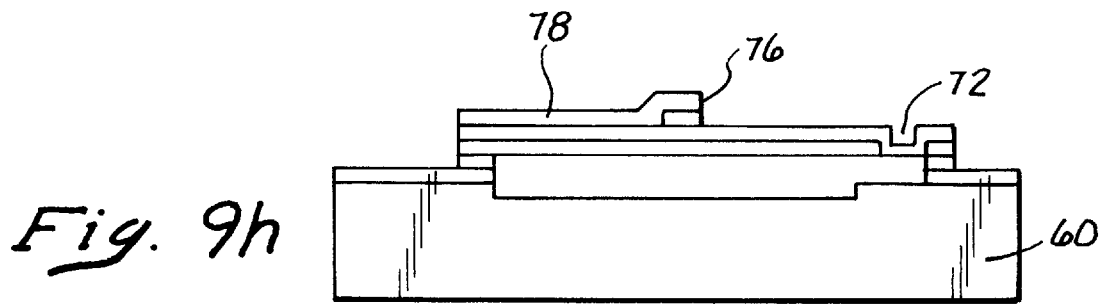

To form the thermistors, a 450 nanometer polysilicon layer 74 is deposed and patterned as shown if FIG. 9g. Polysilicon layer 74 is then ion-implanted with phosphorous using a total dose of about $10^{16}$ atoms per square centimeter. The wafer structure is then annealed at about 1,000 centigrade for 1 hours to activate the dopant to reduce the intrinsic stress in the as deposited polysilicon 74. A 100 nanometer layer of low pressure chemical vapor deposition silicon nitride is deposited for passivating a polysilicon resistor to prevent resistance drift. Finally, aluminum metalization 78 is disposed and patterned using conventional photolithography to form the leads.

The shear stress sensor should be flat so as to not cause surface roughness effects such as signal fluctuation. With the methodology of the invention, roughness of only 450 nanometers can easily be achieved. Wind tunnel tests demonstrate that a shear stress sensor which has a diaphragm disposed over a vacuum cavity exhibits a superior thermal isolation over an identically designed sensor disposed over a silicon substrate or air filled cavity. Thermal isolation is approved about 1.33 times over an air filled cavity and about 9 times over a shear stress sensor mounted on a silicon substrate. The electrical time constant for a resistor 100 microns long, 2 microns wide and 0.45 microns thick was measured to be about 8 microseconds with the thermal time constant being about 350 microseconds. Corner frequencies at 500 hertz and 20 kilohertz were also observed. Wind tunnel shear stress sensitivities of 15 kilovolts per kPa are measured under constant current modes for the sensor.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

For example, it must be understood that the micromachined hot-wire anemometer probe and shear stress sensor have described in the illustrated embodiment only for purposes of example. Any cross section or configuration of the sensing wire may be employed using photolithography, electron beam lithography or X-ray beam lithography. Sensing wires 12 themselves may have either positive or negative temperature coefficients resistance and be made of either thin or thick film materials such as polycrystalline silicon, platinum, tungsten, or doped junction semiconductor materials. Any material having an energy exchange rate with surrounding fluid flow can be exploited.

The probe in the invention can be made with or without an epitaxial silicon beam 16 between supports 14 and handle 18. Supports 14 may be made of polysilicon, single crystal silicon or any other thick or thin film having the required mechanical strength when combined with metalizations. The probe can also be fabricated without handle 18, if additional strength from manipulation is not required. Silicon nitride or silicon dioxide passivation of sensing wire 12 to prevent oxidation contamination is expressly contemplated. An integrated circuit may be cotemporaneously fabricated into the substrate at the same time that the sensor is made to provide integral signal processing circuitry. Multiple wire probes, short length hot-point probes and longer length hot-wire anemometers may all be employed in combination with each other together with integrated electronics fabricated in the silicon substrate 20 to obtain low cost integrated fast temperature or flow sensors.

The device could even be used as a microthermal knife for microsurgical or cellular applications where wire 12 is simply heated for cauterizing or cutting effects on biological materials.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A micromachined hot-wire thermal shear stress sensor comprising:

a silicon substrate;

a thermal insulation barrier comprising a cavity formed in the substrate and sealed by a silicon nitride diaphragm under vacuum conditions wherein vacuum in the cavity thermally isolates the diaphragm from the substrate;

a polycrystalline silicon thermistor thermally isolated from the substrate by the diaphragm and the cavity; and means for conducting an electrical heating current to the thermistor.

2. The thermal stress sensor of claim 1 further comprising a passivating layer disposed on said thermistor to prevent drift.

3. A micromachined hot-wire thermal shear stress sensor comprising:

a silicon substrate;

a thermal insulation barrier comprising a cavity formed in the substrate and sealed by a diaphragm under vacuum conditions wherein vacuum in the cavity thermally isolates the diaphragm from the substrate; and a thermistor formed integrally with the diaphragm and thermally isolated from the substrate by the diaphragm and vacuum in the cavity.

* * * * *